United States Patent Office 3,315,007
Patented Apr. 18, 1967

3,315,007
DEHYDROGENATION OF SATURATED HYDROCARBONS OVER NOBLE-METAL CATALYST
Joseph B. Abell, Jr., St. Louis, Loyd W. Fannin, Creve Coeur, and James F. Roth, St. Louis, Mo., assignors to Monsanto Company, St. Louis, Mo., a corporation of Delaware
No Drawing. Filed Dec. 28, 1964, Ser. No. 421,689
5 Claims. (Cl. 260—683.3)

The present invention relates to the catalytic conversion of hydrocarbons. More particularly, the present invention relates to a catalyst, a method for preparation of the catalyst and a process for the use of the catalyst whereby saturated hydrocarbons are converted by dehydrogenation to mono-ethylenically unsaturated hydrocarbons.

The use of noble metals as catalytic agents is well known in the prior art. Generally, the noble metal catalytic agents have been proposed in combination with a carrier or support material such as alumina, silica, silica-alumina, silica-magnesia and others. Such compositions usually contain minor amounts of catalytically active noble metals seldom greater than 5 percent by weight. These noble metal containing catalysts have been used and suggested for such hydrocarbon conversion reactions as dehydrocyclization, reforming, hydrogenation, dehydrogenation, polymerization, alkylation, cracking, etc. However, because of the cost of the noble metal catalysts in relation to their catalytic activity both initially and over a continued period of time, they have not always found wide commercial acceptance.

In order to improve both the initial and continued activity and to modify the activity of the noble metal containing catalyst, considerable attention has been directed to modifying the catalytic properties of such catalysts. The efforts to modify the properties of the catalyst have taken the form of varying the concentration and choice of components for combination with noble metals. In addition, the prior art has shown that surprisingly different results are obtained when the noble metals are impregnated on different supports. Further, it has been shown that even the choice of the particular noble metal salts from which the noble metal is impregnated onto the support is of criticality in many utilities of noble metal catalysts. The acidity of the noble metal containing catalyst has also been shown to be highly important. Further, in co-pending application Ser. No. 421,622 it has been shown that even the order of impregnation of components including a noble metal and an alkali or alkaline earth metal is of vital importance. Thus, it is apparent that many factors enter into the adaptation and optimization of noble metal containing catalysts in the various utilities to which such catalysts may be put.

It is an object of the present invention to provide a catalyst, a method for the preparation of the catalyst, and a process for the conversion of hydrocarbons. Another object of the present invention is to provide a catalyst, a method for the preparation of the catalyst and a process for the use of the catalyst whereby saturated hydrocarbons are converted by dehydrogenation to mono-ethylenically unsaturated hydrocarbons. Yet another object of the present invention is to provide a noble metal containing catalyst, a method for the preparation of such catalyst and a process for use of such catalyst in the conversion of hydrocarbons. Another object of the present invention is to provide a noble metal containing catalyst, a method for the preparation of such catalyst and a process for use of such catalyst in the conversion of saturated hydrocarbons to mono-ethylenically unsaturated hydrocarbons whereby substantially increased catalytic activity is obtained. Additional objects will become apparent from the following description of the invention herein disclosed.

The present invention, which fulfills these and other objects, is a catalyst, a method for the preparation of the catalyst and a process for the dehydrogenation of saturated hydrocarbons to mono-ethylenically unsaturated hydrocarbons. The catalyst is a noble metal containing catalyst which comprises an alumina impregnated with 0.02 to 5.0 percent by weight of a noble metal, said noble metal containing catalyst having been subjected to reduction conditions in the presence of a reducing gas until the noble metal was substantially reduced and thereafter hydrogen activated by treating for at least 1 hour at elevated temperatures with hydrogen. In carrying out the dehydrogenation process of the present invention, saturated hydrocarbons are contacted in the presence of hydrogen and at elevated temperatures and a pressure sufficient to produce mono-ethylenically unsaturated hydrocarbons with the catalyst hereinabove described. The catalyst and process of the present invention result in a significantly improved activity of the catalyst both initially and throughout the period of use of the catalyst. In addition, the dehydrogenation process involving the catalyst of the present invention results in improved conversion of saturated hydrocarbons to mono-ethylenically unsaturated hydrocarbons as well as a good yield of mono-ethylenically unsaturated hydrocarbons. Further, with the catalyst of the present invention, when used in the dehydrogenation process of the present invention, undesirable side reactions such as cracking, skeletal isomerization and aromatization as well as the formation of poly-ethylenically unsaturated hydrocarbons and carbon are substantially reduced.

By "noble metal," as that term is used herein, is meant a metal selected from the group consisting of platinum, palladium, iridium, ruthenium, osmium, and rhodium. While all of these metals included within the scope of the term "noble metal" as defined above, are useful in preparing the catalyst composition of the present invention, the noble metals preferred in practicing the present invention are platinum and palladium. In the particularly preferred manner of practicing the present invention, the noble metal most often used in the catalyst composition is platinum.

The amount of noble metal present in the catalyst of the present invention may vary from as low as 0.02 percent by weight of the total composition to as high as 5.0 percent by weight of the total composition. The optimum amount of noble metal present in the catalyst of the present invention will, of course, vary to some extent depending upon the particular utility to which the catalyst is put. However, it usually will be within these defined limits. Generally, amounts of the noble metals of the present invention in excess of the above limits are avoided because of the relatively high cost of these metals. Noble metal concentrations below those defined above, usually are impractical to use because of rather low conversions. In using the catalyst composition of the present invention for the dehydrogenation of saturated hydrocarbons the concentration of noble metal in the catalyst composition is usually within the range of from approximately 0.02 to 2.0 percent by weight of the total catalyst, preferably 0.02 to 1.0 percent by weight of the total catalyst. In the preferred practice of the present invention in which platinum or palladium are used as the noble metal constituents of the catalyst and in which the catalyst is used in the dehydrogenation of saturated hydrocarbons, it is preferred that the amount of these noble metals present in the catalyst composition be within the range of 0.1 to 1.0 percent by weight of the total composition.

In addition to the noble metal and the alumina support of the catalyst of the present invention, it is often desired to add a promoting metal such as an alkali metal or an alkaline earth metal. Among the alkali metals useful in the present invention are sodium, potassium, lithium, rubidium and cesium. The alkali metals preferred in the present catalyst composition are sodium and potassium. The alkaline earth metals include calcium, barium, strontium and magnesium. Preferably, calcium or magnesium is used as the alkaline earth metal in the catalyst compositions of the present invention.

When an alkali or alkaline earth metal is used in the present catalyst compositions, it is most often present in an amount of at least 0.01 percent by weight of the total catalyst composition, more often, within the range of 0.01 to 20 percent by weight. However, it is usually preferred that the amount of the alkali or alkaline earth metal present in the catalyst be within the range of from approximately 0.02 to 5.0 percent by weight of the total catalyst composition.

Though the alumina supports of the present invention include any of the forms conventionally used for supporting catalytically active metals, most often the alumina supports of the present invention possess particular characteristics as to surface area and macropore volume. The alumina carriers useful in the present invention usually possess a surface area of at least 10 square meters per gram. Preferably, these carriers have surface areas of at least 30 square meters per gram. Generally, the alumina carriers of the present invention have macropore volumes of at least 0.05 cc. per gram, preferably, however, the macropore volume of the carriers most useful in the present invention is at least 0.07 cc. per gram. Macropore volume as used herein refers to the total volume of pores within the alumina having a pore radius of greater than 350 angstroms per unit weight of alumina. The macropore volume is expressed herein in terms of cubic centimeters per gram of alumina of pores having a radius greater than 350 angstroms. The use of alumina supports having these limitations as to macropore volume and surface area contributes significantly to the maximum utilization of the noble metal of the catalyst composition. Such maximum utilization of the noble metal in many instances reduces to a very significant extent the total amount of noble metal necessary in the catalyst composition. The macropore volume is determined by Aminco-Winslow mercury porosimeter, Model 5–7107 (American Instrument Company) or equivalent mercury penetration apparatus and represents the internal volume penetrated between 0 and 2500 p.s.i.g. A discussion of macropore volume determination is found in Industrial and Engineering Chemistry, 17, 787 (1945).

The noble metal containing catalyst of the present invention most often contains the noble metal in a highly and uniformly dispersed state. It has been found that high dispersion of the noble metal on the alumina support has a considerable effect on the efficiency of the catalyst of the present invention. Particularly is this so when these catalysts are used in the dehydrogenation process of the present invention. A high dispersion of noble metal on the catalyst support contributes to maximum utilization of the noble metal in the catalyst composition, as well as to increased catalyst activity. Further, catalyst activity is maintained higher by the high dispersion of the noble metal components since agglomeration of the noble metal, which is a cause of activity decline is thereby significantly reduced.

Most often, the noble metal contained in the catalyst of the present invention is uniformly distributed throughout. For the purposes of the present invention, uniform distribution may be defined in terms of the local concentration of noble metal upon the support. To meet the standards of the present invention, the finished catalyst preferably has at least 50 percent by weight of the total noble metal present in a catalyst particle present in a local noble metal concentration which is no greater than at least twice that of the total noble metal concentration in the particle. For example, if the total noble metal content of a catalyst particle is 0.1 percent by weight of the particle, then at least 0.05 percent by weight of the noble metal of the particle is distributed such that in any given segment or locale of the catalyst particle a concentration of noble metal in said segment or locale is no greater than 0.2 percent by weight of said segment or locale. The local noble metal concentration for any given segment of a catalyst particle may be determined by electron probe microanalysis as described in "The Microscan X-ray Analyzer Mark II," Cambridge Instrument Company, Ltd., London and Cambridge, England [1961], "Proceedings of the X-ray Colloquium Spectroscopic, Internationale," by V. E. Cosslett, Spartan Books, Washington, D.C., pages 357 to 381 [1963], and in "Metallurgica," 16, No. 367, pages 205 to 212 [May 1960]. The uniform distribution of the noble metal within the alumina support contributes materially to increased catalyst activity as well as longer catalyst life.

The method by means of which the dehydrogenation catalysts of the present invention are prepared generally involves contacting the catalyst support with a solution comprised of a noble metal salt dissolved in a suitable solvent. The amount of metal salt dissolved in the solvent usually is that amount sufficient to place the desired amount of the metal on the alumina support. Determination of this amount of metal salt is readily within the ability of those skilled in the art. The method of contacting the metal salt solution with the alumina support may be by pouring the solution over the support, by totally immersing the support within the solution or by treating the support with just enough of the solution to be completely absorbed by the alumina support. In many instances, it may be desirable to mildly agitate the impregnating noble metal salt containing solution to aid contact between the solution and the alumina support.

After the catalyst support has been contacted with the impregnating solution of solvent and noble metal salt until the solution has been adsorbed, the impregnated support is then dried in air or other such atmosphere at a temperature of 50 to 150° C. After this drying period, the catalyst is usually calcined in air or other oxygen containing gas at 300 to 600° C. Calcination generally is complete in 1 to 12 hours.

In preparing a preferred catalyst composition of the present invention which contains at least 0.01 percent by weight of a metal selected from the group consisting of alkali metals and alkaline earth metals in addition to the noble metal and alumina, it is usually preferred that the alkali or alkaline earth metal be incorporated into the catalyst prior to impregnation of the alumina support with the noble metal. Incorporation of the alkali or alkaline earth metal may be by co-precipitation, impregnation, or other conventional methods. In preparing the catalyst composition of the present invention wherein an alkali or alkaline earth metal is incorporated in the catalyst, the catalyst composition is usually dried and preferably calcined after incorporation of the alkali or alkaline earth metal therein and prior to treatment of the support with the noble metal containing solution.

After the catalyst composition of the present invention has been calcined it is next subjected to reduction in the presence of hydrogen or other reducing gas in order to obtain the noble metal in a reduced form. Usually reduction temperatures in excess of 300° C. are used.

After reduction is substantially complete, it has been found that substantially improved results may be obtained from the present catalyst composition if it is treated for a period of at least 1 hour at elevated temperatures with hydrogen. Such treatment is referred to as "hydrogen activation." Usually the hydrogen activation is carried out at elevated temperatures in excess of 350° C. This temperature is most often within the range of 350 to 550° C. It is somewhat preferred, however, that a temperature of 420 to 520° C. be used for this treatment. A preferred hydrogen activation is one conducted in flowing hydrogen at a temperature of 420 to 520° C. for 2 to 24 hours.

The hydrogen activation treatment disclosed herein is not only very useful in the initial preparation of the catalyst, but also finds great utility as an extra step in the regeneration of the catalyst between reaction cycles. Normally, when a reaction cycle is complete the catalyst is regenerated by passing air or other oxygen containing gas over the catalyst to burn off carbon and coke deposits. After this regeneration the catalyst is, in most instances, reduced in the presence of hydrogen or other reducing gas until reduction is complete. In accordance with the present invention after reduction is complete the catalyst is then subjected to hydrogen activation as above described. Such treatment results in an increased catalyst life with a higher initial activity as well as a higher activity throughout the period of use of the catalyst.

In order to further describe as well as to illustrate the present invention, the following examples are presented. These examples are not to be construed as in any manner limiting the present invention.

*Example I*

Two catalysts were prepared from an alumina having a surface area of 220 square meters per gram, a macropore volume of 0.20 cc. per gram and sodium content of 0.30 percent. The alumina was in the form of ⅛ inch diameter balls. The catalyst was prepared by saturating the alumina with a solution of platinum-diamino-dinitrite salt. The platinum-diamino-dinitrite solution was prepared by heating an amount of the salt sufficient to obtain a platinum concentration of 0.0030 gram of platinum per ml. of catalyst (bulk volume) in distilled water and adding 10 ml. of concentrated ammonium hydroxide per gram of platinum salt present and, after dissolving the salt, adjusting the volume of the solution by addition of water to an amount sufficient to totally saturate the alumina. The two catalysts were dried in air for 5 hours at 120° C. and then calcined at 450° C. for an additional two hours. Both of the catalysts were then reduced in pure hydrogen at 440° C. for one hour. After completion of reduction one of the catalysts, hereinafter designated Catalyst A, was subjected to hydrogen activation in accordance with the present invention. This hydrogen activation was carried out at 440° C. for 22 hours in the presence of pure hydrogen. The other catalyst, hereinafter designated Catalyst B, was not subjected to hydrogen activation. Each of the catalysts was found to contain 0.43 percent by weight of platinum.

To demonstrate the advantages obtained from the catalyst and process of the present invention, the dehydrogenation of a n-dodecane feed was carried out in the presence of both Catalyst A and Catalyst B. Each dehydrogenation run was carried through two synthesis cycles or runs of 24 hours each with the catalyst being regenerated and reduced between runs. In addition, Catalyst A was hydrogen activated at 440° C. for 3 hours after reduction between the cycles. The reaction conditions in both dehydrogenation runs were substantially the same, the temperature being 440° C., the pressure at substantially atmospheric pressure (±2 p.s.i.) and a liquid hourly space velocity of the hydrocarbon of 4.65. Hydrogen was introduced concurrently with the n-dodecane in a mole ratio of hydrogen to hydrocarbon of 2:1. The following table gives the average percent conversion to mono-olefin of the n-dodecane and the yield of mono-olefin in the conversion product for each of the two catalysts, Catalyst A and Catalyst B, for two successive synthesis cycles.

|  | Conversion Cycle | | Yield Cycle | |
| --- | --- | --- | --- | --- |
|  | 1 | 2 | 1 | 2 |
| Catalyst A | 15.7 | 15.3 | 66.0 | 67.2 |
| Catalyst B | 14.2 | 12.3 | 70.5 | 75.0 |

The above results demonstrate the considerably improved conversions obtained with the catalyst and process of the present invention. Particularly, the substantially improved cycle 2 conversion should be noted.

*Example II*

Two catalysts, hereinafter referred to as Catalyst C and Catalyst D were prepared in the same manner as described for Catalysts A and B in Example I with the exception that the alumina was one having a surface area of 72 square meters per gram, a macropore volume of 0.12 cc. per gram and a sodium content of 0.19%. Catalyst C was hydrogen treated in accordance with the present invention while Catalyst D was not. These two catalysts were then used in the dehydrogenation of n-dodecane in the same manner as those in Example I. The results as to conversion and yield after a 24-hour cycle are presented in the table below.

|  | Average Conversion To Mono-olefin | Yield |
| --- | --- | --- |
| Catalyst C | 13.1 | 73.2 |
| Catalyst D | 11.6 | 76.5 |

The dehydrogenation process of the present invention is generally operated at elevated temperatures. More often these temperatures are within the range of from approximately 400 to 640° C. At temperatures below this range, conversions are so low that reaction becomes impractical while at temperatures above this range excessive side reactions occur. The preferred temperatures for operating the present dehydrogenation process with the preferred feeds are within the range of from approximately 420 to 520° C.

Pressures at which the present process is operable are somewhat critical to the present invention. The pressure may range from subatmospheric pressure up to 100 p.s.i.g. and higher. However, in most instances, pressures substantially atmospheric, i.e. 0 to 30 p.s.i.g., are used. High pressures are less preferred than low pressures since at higher pressures catalyst conversions are significantly reduced.

The contact time of the saturated hydrocarbons with the catalyst of the present invention in accordance with the dehydrogenation process disclosed herein will seldom be above 5.0 seconds or below 0.05 second. At contact times below this range reaction is incomplete and conversions are low. At contact times above this range there is excessive formation of aromatics, polyolefinic compounds and cracked products. Preferably, a contact time of 0.1 to 2.0 seconds will be used in the practice of the present dehydrogenation process.

One of the more important process limitations of the dehydrogenation process of the present invention is found in the use of a diluent with the hydrocarbon feed to be dehydrogenated. The most commonly used diluent is hydrogen. Hydrogen is usually present in a mole ratio of hydrogen to the saturated hydrocarbon feed of from approximately 0.1:1 to 5:1. However, it is preferred that a hydrogen to hydrocarbon mole ratio of 1:1 to 3:1 be used in operating the present invention.

The feedstocks to the dehydrogenation process of the present invention are saturated hydrocarbons. Included within this group are the straight-chain, branched-chain and cyclic saturated hydrocarbons. Such hydrocarbons may be of from 2 to 30 carbon atoms. Included within this group are such compounds as ethane, propane, butane, pentane, methyl-heptanes, nonane, isononane, decane, isodecane, dodecane, isododecane and the like. A particularly effective utilization of the present invention, both the catalyst of the present invention and the dehydrogenation process disclosed herein, resides in the dehydrogenation of straight-chain paraffin hydrocarbons, particularly those of 10 to 18 carbon atoms. The product of the dehydrogenation of these straight-chain hydrocarbons has been found, quite unexpectedly, to provide an alkylate for the preparation of alkyl aromatic sulfonate detergent composition which is substantially biodegradable. The preferred feeds of the present invention are those having 6 to 20 carbon atoms per molecule.

In carrying out the dehydrogenation process of the present invention, superficial linear velocities of the reactants within the dehydrogenation reactors most often used are within the range of 0.2 to 15 feet per second. Usually within this range superficial linear velocities toward the higher end of the range are preferred.

The apparatus and arrangement of apparatus for carrying out the dehydrogenation process of the present invention is not particularly critical. It is only necessary that good engineering principles be followed in the design and arrangement of the equipment.

What is claimed is:

1. A process for dehydrogenation of saturated hydrocarbons to mono-ethylenically unsaturated hydrocarbons which comprises contacting said saturated hydrocarbons concurrently with hydrogen in a mole ratio of hydrogen to saturated hydrocarbons of 0.1:1 to 5:1 at a temperature of 400 to 650° C. and at a pressure and space velocity sufficient to cause dehydrogenation of said saturated hydrocarbons with a catalyst comprising 0.02 to 5 percent by weight of a noble metal, said catalyst having been activated in an atmosphere consisting essentially of hydrogen at elevated temperatures within the range of 350 to 550° C. for at least 2 hours after completion of reduction of said catalyst.

2. The process of claim 1 wherein the pressure is no greater than 100 p.s.i.g.

3. The process of claim 1 wherein the saturated hydrocarbons have 2 to 30 carbon atoms.

4. The process of claim 1 wherein the noble metal is one selected from the group consisting of platinum and palladium.

5. The process of claim 1 wherein said catalyst contains in addition to noble metal and alumina, at least 0.01 percent by weight of a metal selected from the group consisting of alkali and alkaline earth metals.

References Cited by the Examiner
UNITED STATES PATENTS

| | | | |
|---|---|---|---|
| 2,908,654 | 10/1959 | Heinemann et al. | 252—466 |
| 3,058,907 | 10/1962 | Van Nordstrand et al. | 208—138 |
| 3,113,980 | 12/1963 | Robinson | 252—466 |
| 3,126,426 | 3/1964 | Turnquest et al. | 252—466 |

DELBERT E. GANTZ, *Primary Examiner.*

G. E. SCHMITKONS, *Assistant Examiner.*